Figure 3:
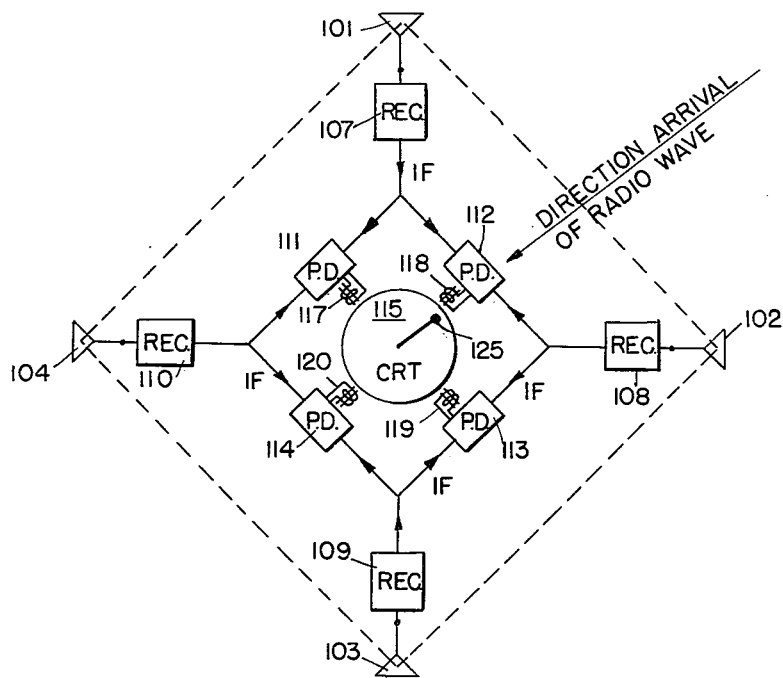

Oct. 17, 1961  T. R. O'MEARA  3,005,200
THREE-ELEMENT, VECTOR-PHASE RADIO DIRECTION FINDER
Filed March 15, 1954  2 Sheets-Sheet 1
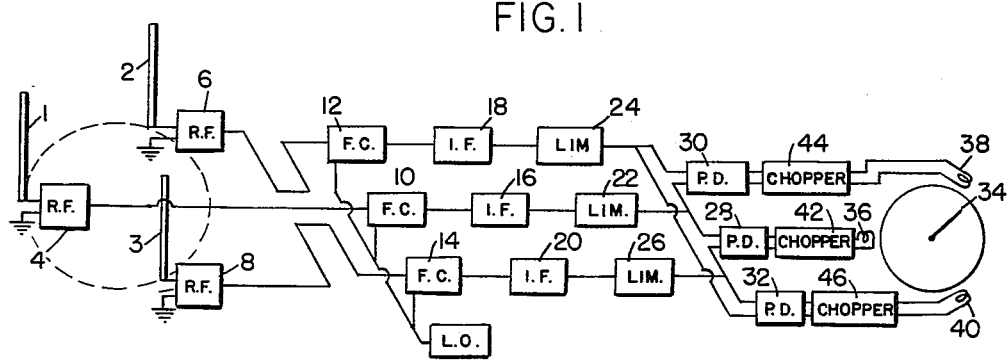
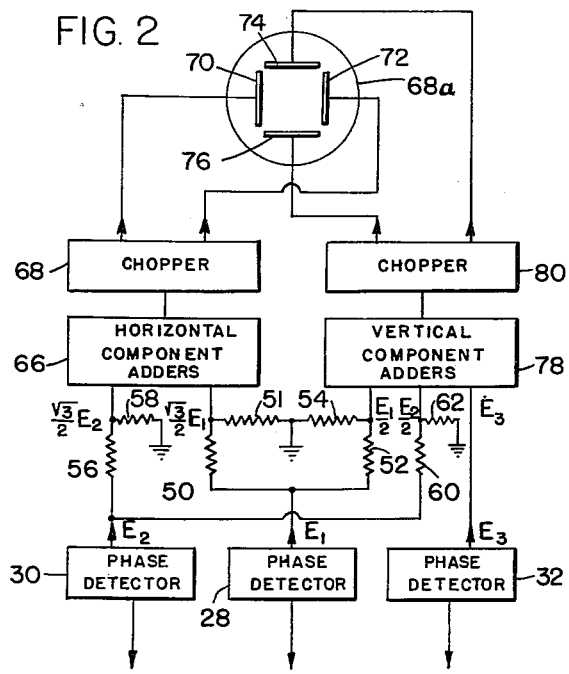
INVENTOR:
THOMAS R. O'MEARA

INVENTOR:
THOMAS R. O'MEARA

3,005,200
THREE-ELEMENT, VECTOR-PHASE RADIO DIRECTION FINDER
Thomas R. O'Meara, Urbana, Ill., assignor, by mesne assignments, to the United States of America as represented by the Secretary of the Navy
Filed Mar. 15, 1954, Ser. No. 416,451
7 Claims. (Cl. 343—123)

This invention relates to a method and apparatus for determining the azimuthal direction of arrival of radio signals. More specifically, the invention relates to a radio-direction finder operating on the phase-comparison theory of operation for determining the azimuthal direction of arrival of a radio signal of a short time duration.

Prior methods of evaluating the results of measuring the direction of arrival of radio signals of a short time duration are numerous. The system which is most closely comparable with the vector-phase system of this invention is the dual-channel or Watson-Watt direction finder. In the Watson-Watt system, four antenna elements are placed at the corners of a square and opposite antenna elements are differentially connected together at the location of the antenna elements. The two resultant voltages from this connection are separately fed to two-radio-receiver channels after which the signals are respectively fed to the horizontal and vertical deflection coils of a cathode-ray tube indicating device. The radial position of a line on the face of the tube indicates the bearing of the received signal. In order to obtain accurate results with this system, it is necessary that both receiver channels have identical gain and phase characteristics. It is very difficult to obtain two receivers with identical gain characteristics, especially where the tuning of receivers must be varied to detect signals of different frequencies.

Another disadvantage of the Watson-Watt system is that the antenna-coupling circuits, transmission-matching-line circuits, and the antenna-differential circuits are hard to adjust and maintain a balance of a wide range of operating frequencies. The circuits generally result in a considerable loss of induced antenna voltage with a consequent possible loss in signal-to-noise ratio.

Accordingly, one object of the invention is to provide a novel radio-direction-finding system for use with signals of short time duration wherein it is not necessary that the receiver gain characteristics of the several channels be identical.

Another object of the invention is to provide a novel radio-direction-finding system for use with signals of short time duration in which the results are not dependent to any great extent upon maintaining impedance or gain variations due to the use of equipment over a wide range of operating frequencies.

A further object of the invention is to provide a novel radio-direction-finding system having an improved signal-to-noise ratio.

A still further object of the invention is to provide a novel and improved radio-direction-finding system which instantaneously provides the direction of arrival of an oncoming wave with greater accuracy than existing systems of like complexity.

The preferred embodiment of the present invention comprises a three-element antenna system wherein the elements are spaced at intervals about a circle and in which the outputs of each antenna element are fed separately to three receiver channels. The outputs from each receiver are fed through phase detectors which compare phases of the signals of each receiver separately with the signal of every other signal and derives voltages whose magnitudes are a function of the phase differences of the compared voltages.

These resultant voltages are then fed to the deflection means of a cathode-ray tube indicating device in a manner which provides a spot or line on the face of the tube whose radial position is a measure of direction of arrival of the received signal. The accuracy of the system does not depend upon the received channels having identical gain characteristics, since the phases of the signals are not compared until after the signals have passed through the radio-receiver channels.

Preferably at least, the first stage of each radio-receiver channel is placed at the base of the antenna element to improve the signal-to-noise ratio of the system.

Other objects and features of the invention will become more apparent upon making reference to the specification, claims, and drawings wherein:

FIGURE 1 is a simplified circuit diagram of the preferred embodiment of the invention; and FIGURE 2 is a modification of the embodiment of FIGURE 1; and FIGURE 3 is still another modification of the present invention.

Referring now more particularly to FIGURE 1, the preferred embodiment of the invention there shown includes three antenna elements, 1, 2, and 3, spaced 120° apart. At the base of each antenna element are respective-radio-frequency amplifier stages 4, 6, and 8, the outputs of which are coupled to respective frequency-converted stages 10, 12, and 14 of conventional design. The frequency of the signal is converted to a lower intermediate frequency signal which is then fed to respective intermediate frequency amplifiers 16, 18, and 20. At the output of the intermediate frequency amplifier stages, the signals are respectively fed to conventional limiter stages 22, 24 and 26, respectively, as found, for example, in most frequency-modulation receivers. These stages are adjusted, so that they clip the tops of the signals in each channel, so that any amplitude variations of the various signals which may cause errors in the system are effectively eliminated.

The output of limiter stages 22, 24, and 26 are respectively fed to similar conventional linear phase-detector circuits 28, 30, and 32, respectively, where the signals from each limiter stages are separately compared in phase with signals from the other limiter stages. Thus, as shown in the drawings, the outputs of limiter stage 22 is fed to the input of phase-detector circuits 28 and 30. The output of limiter stage 24 is fed to the input terminals of phase detectors 30 and 32. The output of limiter stage 26 is fed to the input terminals of phase detectors 28 and 30. Thus, the phases of the signals received by each antenna element are separately compared with the signals originated from each of the other antenna elements at the output of the receiver channels.

It is, of course, important that the phase characteristics of each of the receiver channels be substantially identical, because it is the phase differences of the signals which indicate the direction of arrival of the signals received.

The antenna elements 1, 2, and 3 are preferably spaced close together relative to a wave length of the expected signal. In such case, phase detectors 30 and 32 may be any suitable well-known phase detector which, for example, produces a direct current across their output terminals, which is preferably a linear function of the phase differences of the two signals fed to its input terminals.

If the outputs of the particular phase detector utilized are not affected by amplitude variations of the applied signals, then the limiters may, of course, be eliminated.

The circuitry described thus far in the embodiment of FIGURE 1 is also utilized with the embodiment shown in FIGURE 2, so that it should be understood that any differences between the embodiments will not be described.

In the embodiment of FIGURE 1, a cathode-ray tube indicating device 34 having three deflection coils 36, 38, and 40 spaced 120° apart is utilized. If the direct-current outputs from the phase detectors 28, 30, and 32 were respectively fed directly to deflection coils 36, 38, and 40, a spot would appear on the face of the cathode-ray tube whose radial position is indicative of the direction of arrival of the oncoming wave. Since it is usually more suitable to have the indication in the form of a radial line rather than a spot, suitable (chopper) circuits 42, 44, and 46 are used to convert the direct-current output phase detectors 28, 30, and 32 to an alternating-current voltage, so that a line appears on the face of the cathode-ray tube 34. These chopping circuits could comprise conventional electric vibrators in series with the direct-current output of the phase detectors which will provide square-wave voltages having an amplitude dependent upon the amplitude of the direct-current voltage output of the associated detector circuits. If desired, suitable filter circuits could be used to filter out the fundamental component of the square wave to produce a sinusoidal wave form, so that a more brilliant line will extend from the center of the cathode-ray tube 34.

Although FIGURE 1 shows the deflection means of cathode-ray tube 34 as deflection coils, it is apparent that deflection plates could be substituted therefor.

When it is desired to use more conventional cathode-ray tubes having only two sets of beam-deflection plates or coils representing horizontal and vertical beam-deflection means, the circuit of FIGURE 2 may be utilized.

Since the circuitry used in front of phase detectors 28, 30, and 32 of FIGURE 2 is identical to that shown in FIGURE 1, FIGURE 2 includes only the phase detectors and the components following them. In this embodiment, the direct-current output voltages $E_1$, $E_2$, and $E_3$ of phase detectors 28, 30, and 32, respectively, are converted to voltage components which, when vectorially added at 90°, will produce a voltage vector indicating the direction of arrival of the received signal. The direct-current output of one of the phase detectors 28 is converted to representative orthogonal voltage components by means of suitable voltage-divider circuits comprising resistors 50 and 51 connected in series between the output of phase detector 28 and ground and also resistors 52 and 54 connected in series between the same two latter points. The ratio of resistors 50 and 51 is such that a direct-current voltage is obtained across resistor 51 which is $\sqrt{3/2}$ times the voltage output $E_1$ of phase detector 28, and the ratio of resistors 52 and 54 is such that the voltage across resistor 54 is one-half of the output $E_1$ of phase detector 28. In a like manner, two voltage-divider circuits including series resistors 56—58 and 60—62, respectively, coupled to the output of phase detector 30 provide voltages across resistors 58 and 62 which are, respectively, $\sqrt{3/2}$ and one-half of the output of phase detector 30. It can be shown that if the voltage components which are $\sqrt{3/2}$ of the output of the associated phase detectors 28—30 are added together and then vectorially added at a 90° angle to a voltage which represents the sum of the voltage output of the other phase detector 32 and the voltages which are one-half of the output of the other phase detectors 28 and 30, that vector results which indicates the direction of arrival of the received signal. Accordingly, the voltages across resistors 51 and 58 representing $\sqrt{3/2} \, E_1$ and $\sqrt{3/2} \, E_2$, respectively, are fed to a conventional adding network 66. The voltages across resistors 54 and 62 representing $$\frac{E_1}{2} \text{ and } \frac{E_2}{2}$$

are fed with the output $E_2$ of phase detector 32 to an adding network 78. The outputs of the adding networks 66 and 78 are fed to chopper circuits 68 and 80 which are similar to those in use in FIGURE 1. The output of chopper circuit 68 is fed in the form of a pulsating voltage whose amplitude is proportional to the output of component adder 66 to horizontal beam-deflecting means 70 and 72 of a cathode-ray tube 68a. The output of chopper circuit 80 is fed to the vertical deflection plates 74—76 of cathode-ray tube 68a. Cathode-ray tube thus vectorially adds to orthogonal voltage components obtained from adding networks 66 and 78.

It should be understood, of course, that phase detectors 28, 30, and 32 as well as adder circuits 66 and 78 and chopper circuits 68 and 80 should be similar since the amplitude of the outputs of these circuits, of course, determines the radial position of the indication on the face of the cathode-ray tube 68a. The same is true for the phase detectors and chopper circuits shown in FIGURE 1.

The circuits shown in FIGURES 1 and 2 are of such nature that they will indicate simultaneously the angle of arrival of signals of short duration, such as radar signals. There are no adjustments or balancing of circuits necessary to effect an indication which accurately shows the direction of arrival of the oncoming wave.

The use of a three-element antenna array wherein the signal from each antenna is compared in phase with the signal of every other antenna as shown in FIGURES 1 and 2 is preferred, since it can be shown that it is much simpler and produces smaller errors under certain circumstances than, for example, a four-element array having an even number of elements requiring additional receivers and phase detectors.

However, in order to indicate more clearly the generic aspects of the invention, reference should now be made to FIGURE 3 which shows a four-element system. Four similar antenna elements, 101, 102, 103, and 104, closely placed (relative to the wave length of the received wave) about the corners of a square are respectively coupled to four receivers, 107, 108, 109, and 110, where the signals detected thereby are amplified. As in the previously described embodiments, the receivers have similar phase characteristics and should preferably include limiter stages unless the particular phase detectors used are amplitude sensitive. The outputs of the receivers associated with adjacent antennas are compared in phase. Accordingly, the output of receiver 110 is fed to the input of suitable phase detectors 111 and 114 which produce a direct-current voltage linearly proportional to the phase difference of the two signals fed to the respective inputs thereof. The output of receiver 107, which is associated with antenna 101, which is adjacent antenna 104, is fed to the input of phase detector 111 as well as a similar phase detector 112. In a similar manner, the output of receiver 108, which is associated with antenna 102, which is adjacent antenna 101, is fed to the input of the latter phase detector and also to another similar phase detector 113. The output of receiver 109 is fed to the input of the latter phase detector to which the signal originating in adjacent antenna 102 is fed, and also to the input of phase detector 114 also associated with adjacent antenna 104.

A cathode-ray tube is used having as many separate deflecting means as there are phase detectors. Accordingly, a cathode-ray tube 115 is provided having four deflection coils 117—120 spaced in a manner similar to antennas 101—104 which are respectively coupled to the direct-current output of phase detectors 111—114. Since no chopper circuits are utilized, a spot 125 appears at a radial position indicative of the direction of arrival of the oncoming wave.

Although the invention has been explained in connection with radio waves, it should be understood that it could apply to other analogous phenomena having wave fronts similar to those of radio waves, such as sound.

The term "antenna element" used in the claims is meant to include any wave-detecting element which converts the receiver energy wave to an electrical voltage or current of similar wave form.

It should be also realized that any similar number of direct-current amplifiers could be added to the various signal channels shown in FIGURES 1 and 2 following the phase detectors.

It can be shown that an odd number of antenna elements are preferred, since this results in a small amount of spacing error.

Another alternate method of construction would be to change the relative location of the various receiver components. For example, rather than having the radio-frequency amplifiers at the bases of the antenna elements and the remainder of the receiver located remotely therefrom, it would be possible to have the entire receivers at the base of the antenna elements and the intermediate frequency outputs connected by coaxial cables with the phase detectors at the cathode-ray tube display unit.

As previously stated, the advantage of having a part or all of the receiver at the base of the antenna is an improvement in the signal-to-noise ratio.

The invention thus provides a relatively simple and accurate system for determining the direction of arrival of signals of short duration.

Many other modifications may be made of the preferred embodiments above disclosed without deviating from the broader and more generic aspects of the invention.

I claim:
1. A direction-finding system comprising the combination of a plurality of spaced-antenna elements, a separate receiver channel for each antenna element, each of said receiver channels including a limiter stage to limit the amplitude of the signal in the output thereof, a plurality of phase detecting means for comparing the outputs respectively of each receiver channel separately with the output of at least another different receiver channel and for producing in the output thereof respective voltages whose amplitudes are proportional to the phase differences of the voltages compared, a cathode-ray tube indicating means having a beam-deflection means corresponding in number and spacing around the periphery of the tube to said antenna elements, and means coupling the respective outputs of said phase-detecting means to a different one of said beam-deflecting means to cause the beam of said cathode-ray tube indicating means to be deflected to a position indicating the direction of arrival of the received signal.

2. In a direction finder having a plurality of spaced-antenna elements, a separate amplifier channel for each antenna element, and a cathode-ray tube indicating device including beam-deflection means corresponding in number and spacing around the tube to said antenna elements for deflecting the beam thereof to a position indicative of the direction of arrival of a signal, the improvements comprising the combination of a limiter stage in each amplifier channel for clipping the peaks of the signal fed thereto, phase-detecting means coupled to said amplifier channels for providing at respective output terminals thereof respective voltages having amplitudes proportional to the phase differences between the signal received by each antenna element and every other antenna element, and means coupling said respective output terminals to the beam-deflecting means of said cathode-ray tube indicating device to cause the beam thereof to be deflected in the direction of arrival of the received signal.

3. In a direction finder having a plurality of spaced-antenna elements, a separate amplifier channel for each antenna element, and a cathode-ray tube indicating device including beam-deflection means corresponding in number and spacing to the antenna elements for deflecting the beam thereof to a position indicative of the direction of arrival of a signal, the improvement comprising the combination of a phase-detecting means coupled to said amplifier channels for providing at respective output terminals thereof respective voltages having amplitudes proportional to the phase differences between the signal received by each antenna element and every other adjacent antenna element, means for clipping the tops of the signals in each channel to eliminate errors due to amplitude variations, and means for coupling said respective output terminals to the beam-deflecting means of said cathode-ray tube indicating device to cause the beam thereof to be deflected in the direction of arrival of the received signal.

4. A direction-finding apparatus comprising the combination of a first, second, and third antenna elements spaced 120° apart about the circumference of a circle; a first, second, and third receiver channel connected to said first, second, and third antenna element, respectively; a first, second, and third phase detector each capable of providing across its output terminals a voltage whose magnitude is a function of the phase difference of two voltages fed to the input terminals thereof; means coupling the output of said first receiver channel to the input terminals of said first and second phase detector; means coupling the output of said second receiver channel to input terminals of said first and third phase detector; means coupling the output of said third receiver channel to the input terminals of said second and third phase detector; amplitude limiter means in each receiver channel to clip the peaks of signals received; a cathode-ray tube having beam-deflecting means spaced 120° apart about the periphery of the tube; and means coupling the respective output terminals of said first, second, and third phase detector to the beam-deflecting means of said cathode-ray tube to cause the beam thereof to be deflected in the direction of arrival of said received signal; and amplitude limiter means in each receiver channel to clip the peaks of the signals and to thereby eliminate errors due to amplitude variations.

5. A direction-finding apparatus comprising the combination of a first, second, and third antenna elements spaced 120° apart about the circumference of a circle; a first, second, and third receiver channel connected respectively to said first, second, and third antenna element; a first, second, and third phase detector each capable of providing across its output terminals an output voltage whose magnitude is a function of the phase difference of two voltages fed to the input terminals thereof; means coupling the output of said first receiver channel to the input terminals of the said first and second phase detector; means coupling the output of said receiver channel to the input terminals of said first and third phase detector; means coupling the output of said third receiver channel to the input terminals of said second and third phase detector; a cathode-ray tube indicating device having three beam-deflecting means capable of respectively providing a deflecting force at angles separated by 120° and to a degree proportional to the amplitude of a signal fed thereto; means coupling the output terminals of said phase detector respectively to different deflecting means of said cathode-ray tube indicating device.

6. A direction-finding system comprising a plurality of at least three antenna elements; a separate receiver channel each including an amplitude-limiter stage coupled to each antenna; phase-detecting means coupled to each re-receiver channel for comparing the phases of the voltages at the output of each receiver channel with the output of every other receiver channel and producing a voltage whose magnitude is proportional to the phase differences of the voltage fed thereto; a cathode-ray tube having beam-deflecting means corresponding in number and location about the tube to the number of antenna elements; and means coupling the output of said phase detectors to the beam-deflecting means of said cathode-ray tube to cause the beam thereof to assume a position indicative of the angle of arrival of the receiver signal.

7. A direction-finding system comprising a plurality of at least three antenna elements; a separate receiver channel coupled to each antenna; phase-detecting means coupled to each receiver channel for comparing the phases of the voltages at the output of each receiver channel with the output of at least two other receiver channels, and providing a voltage whose magnitude is proportional to the phase differences of the voltage fed thereto; a cathode-ray tube having two orthogonal deflecting means including deflection coils corresponding in number and relative position about the periphery of the tube to the antenna elements; means for clipping the tops of the signals in each channel to reduce amplitude variations; means coupled to the output of said phase detectors for obtaining orthogonal component voltages therefrom; means for adding together the latter voltages of the same components; and means coupling the two resultant orthogonal component voltages respectively to said two cathode-ray tube deflecting means.

References Cited in the file of this patent

UNITED STATES PATENTS

| | | |
|---|---|---|
| 2,415,088 | Dingley | Feb. 4, 1947 |
| 2,415,955 | Luck | Feb. 18, 1947 |
| 2,419,999 | Leck | May 6, 1947 |
| 2,434,644 | Fairweather | Jan. 20, 1948 |
| 2,520,297 | Anderson | Aug. 29, 1950 |
| 2,557,900 | Wallace et al. | June 19, 1951 |